United States Patent
Nishimura

(10) Patent No.: US 8,106,535 B2
(45) Date of Patent: Jan. 31, 2012

(54) POWER CONDITIONER

(75) Inventor: Kazuhito Nishimura, Katsuragi (JP)

(73) Assignee: Sharp Kabushiki Kaisha, Osaka (JP)

( * ) Notice: Subject to any disclaimer, the term of this patent is extended or adjusted under 35 U.S.C. 154(b) by 365 days.

(21) Appl. No.: 12/439,016

(22) PCT Filed: Aug. 3, 2007

(86) PCT No.: PCT/JP2007/065290
§ 371 (c)(1),
(2), (4) Date: Feb. 26, 2009

(87) PCT Pub. No.: WO2008/026425
PCT Pub. Date: Mar. 6, 2008

(65) Prior Publication Data
US 2009/0236916 A1    Sep. 24, 2009

(30) Foreign Application Priority Data

Aug. 28, 2006  (JP) .................................. 2006-230751

(51) Int. Cl.
*H02J 1/00* (2006.01)
*H02J 7/34* (2006.01)
*H02J 5/00* (2006.01)
(52) U.S. Cl. ................. 307/80; 307/44; 307/45; 307/46
(58) Field of Classification Search ............ 307/44, 307/45, 46, 80
See application file for complete search history.

(56) References Cited

U.S. PATENT DOCUMENTS

| 6,737,762 B2 * | 5/2004 | Koenig ............................ 307/48 |
| 6,795,322 B2 * | 9/2004 | Aihara et al. .................... 363/37 |
| 6,949,843 B2 * | 9/2005 | Dubovsky ........................ 307/64 |
| 7,117,044 B2 * | 10/2006 | Kocher et al. ................... 700/34 |
| 7,227,278 B2 * | 6/2007 | Realmuto et al. ............... 307/44 |

FOREIGN PATENT DOCUMENTS

| JP | 01-318519 | 12/1989 |
| JP | 09-149659 | 6/1997 |
| JP | 2001-357867 | 12/2001 |
| JP | 2002-369406 | 12/2002 |
| JP | 2004-350371 | 12/2004 |
| JP | 2005-295648 | 10/2005 |

OTHER PUBLICATIONS

International Search Report for PCT/JP2007/065290, mailed Sep. 25, 2007.

* cited by examiner

*Primary Examiner* — Rexford N Barnie
*Assistant Examiner* — Hal Kaplan
(74) *Attorney, Agent, or Firm* — Nixon & Vanderhye, P.C.

(57) ABSTRACT

A reliable power conditioner comprises: a power converting circuit for converting direct-current power obtained from a direct-current power source to alternating-current power of a commercial power system; a charger/discharger circuit for charging the direct-current power obtained from the direct-current power source to an accumulator or discharging the direct-current power stored in the accumulator; a control circuit for controlling the power converting circuit and the charger/discharger circuit; and a power source selecting circuit for selecting at least one of first, second, and third power source circuits and supplying power to the control circuit.

10 Claims, 8 Drawing Sheets

Accumulating means side →

← Inverter circuit side

Discharging operation

Charging operation

Discharging  ⟶ Off state  ----▶ On state
operation

Charging  ⟶ Off state  ----▶ On state
operation

Direct-current side →    ← Alternating-current side

POWER CONDITIONER

This application is the U.S. national phase of International Application No. PCT/JP2007/065290, filed 3 Aug. 2007, which designated the U.S. and claims priority to Japanese Patent Application No. 2006-230751, filed 28 Aug. 2006, the entire contents of each of which are hereby incorporated by reference.

TECHNICAL FIELD

The technology described herein relates to a power conditioner capable of converting DC (direct-current) power of a DC (direct-current) power source to AC (alternating-current) power and charging/discharging an accumulator. More particularly the technology described herein pertains to a power conditioner having a characteristic in a circuit for supplying power to a control circuit of the power conditioner.

BACKGROUND

In recent years a dispersed power system as become widely employed for sake of stable energy supply to customers and global environmental protection. The dispersed power system converts AC or DC power (generated by a generator, a solar cell, a fuel cell, wind power generation, or the like) to AC power for commercial-frequency by a power conditioner, and supplies the AC power to a commercial power system and an AC load. Photovoltaic power systems you really are becoming increasing widespread as a type of power system that hardly generates $CO_2$.

FIG. 8 shows a system described in Japanese Unexamined Patent Publication No. 2002-369406 as an example of a conventional power conditioner for a photovoltaic power system. The system has a solar cell 7, a power source system 1, accumulating means 506 for accumulating power of the power system 1 or power generated by the solar cell 7, bidirectional DC/DC means 505 for charging or discharging the accumulating means, and bidirectional AC/DC means 502 for converting power of the solar cell or the accumulating means to AC power and outputting the AC power to the power source system. The system is an interconnected power system such that, in a case where required power of a load 3 is smaller than the photovoltaic generated power, the generated power is sold to the power source system. In addition, power accumulated in the accumulating means 506 is discharged so that the power of the power source system does not exceed a predetermined value, thereby cutting a peak of the power source system 1.

According to the technology disclosed herein of Japanese Unexamined Patent Publication No. 2002-369406, in the interconnected power system in which photovoltaic power generating means and the power accumulating means are combined, while monitoring the power of the power source system, the power discharged from the accumulator is controlled. Consequently, without selling the power accumulated in the accumulator to the power source system, the peak of a load power can be reduced.

Japanese Unexamined Patent Publication No. 2004-350371 discloses a system having an inverter main circuit for converting direct-current power from a plurality of direct-current power sources to alternating-current power, a drive circuit for driving the inverter main circuit, a control circuit for controlling the drive circuit, and a plurality of power source circuits for receiving power supplied from the plurality of direct-current power sources and supplying the power to the drive circuit and the control circuit. The power source circuit for supplying power to the drive circuit and the control circuit is selected from the plurality of power source circuits.

[Patent document 1] Japanese Unexamined Patent Publication No. 2002-369406

[Patent document 2] Japanese Unexamined Patent Publication No. 2004-350371

However, a system such as that described in Japanese Unexamined Patent Publication No. 2002-369406 is considered to involve several problems, although not particularly described in the specification. For example, to accumulate power of a commercial power system which provides power at night time (when electricity is inexpensive and when a solar cell does not generate power), power has to be supplied to a drive power source in a control unit of the system from a power source other than a solar cell, that is, from the commercial power system or an accumulator. In a case where the system has a configuration that a drive power source of the control unit is supplied from the commercial power system, the system cannot operate when service of the commercial power system stops. Moreover, in a case where the system has a configuration that the drive power source of the control unit is supplied from the accumulator, the control unit of the system can normally operate unless the accumulator enters an over discharge state. However, when the accumulator reaches a discharge lower limit, the control unit of the system cannot operate. Consequently, recovery charging for making the accumulator recover from the discharge lower limit cannot be performed.

In Japanese Unexamined Patent Publication No. 2004-350371, power is supplied selectively from a plurality of direct-current power source to a drive circuit and a control circuit. A power source circuit for receiving power supply from a commercial power system and supplying the power is not provided. Consequently, in a case where the accumulator enters a state of discharge lower limit at nighttime during which a solar cell does not generate power, the power cannot be supplied to the drive circuit and the control circuit.

SUMMARY

The technology disclosed herein solves the above-mentioned problems and provides a reliable power conditioner in a system having three power sources: a direct-current power source such as a solar cell, an accumulating unit such as an accumulator, and a commercial power system. The power conditioner can also operate when the commercial power system stops, and can charge the accumulating unit for recovery.

To solve the above-mentioned problems, a power conditioner of the technology disclosed herein includes: a power converting circuit for converting direct-current power obtained from a direct-current power source to alternating-current power of a commercial power system; a charger/discharger circuit for charging the direct-current power obtained from the direct-current power source to an accumulator or discharging the direct-current power stored in the accumulator; a control circuit for controlling the power converting circuit and the charger/discharger circuit; a first power source circuit for supplying power from the direct-current power source to the control circuit; a second power source circuit for supplying power from the accumulator to the control circuit; a third power source circuit for supplying power from the commercial power system to the control circuit; and a power source selecting circuit for selecting at least one of the first, second, and third power source circuits and supplying power to the control circuit.

With this configuration, when service of the commercial power system stops and the third power source circuit does not operate, the control circuit can receive power supply from the first or second power source circuit via the power source selecting circuit and operate. When the accumulator reaches a discharge lower limit and the second power source circuit does not operate, the control circuit can receive power supply from the first or third power source circuit via the power source selecting circuit and operate. Consequently, the system of high reliability can be provided.

Further, in an embodiment of the technology disclosed herein, the power converting circuit includes a DC-DC converter and an inverter circuit, and the inverter circuit converts direct-current power to alternating-current power to output the alternating-current power to the commercial power system interconnected thereto. With this configuration, the direct-current power generated by the direct-current power source can be outputted to the commercial power system via the DC-DC converter and the inverter circuit. Therefore, a user can use the power for an in-house load connected to the commercial power system without distinguishing the power generated by the direct-current power source and the power discharged from the accumulating unit from each other. Therefore, the system capable of supplying alternating-current power from the power conditioner to an in-house load even when power generated by the direct-current power source is small can be provided.

Further, in an example embodiment of the technology disclosed herein, the inverter circuit is a bidirectional inverter. Alternating-current power supplied from the commercial power system is converted to direct-current power by the bidirectional inverter, and the direct-current power is charged into the accumulator by the charger/discharger circuit. Alternately, direct-current power accumulated in the accumulator is discharged by the charger/discharger circuit, the direct-current power is converted to alternating-current power by the bidirectional inverter, and the alternating-current power is outputted to the commercial power system or supplied to a load.

With this configuration, not only the direct-current power obtained from the direct-current power source can be charged to the accumulator via the DC-DC converter and the charger/discharger circuit, but also the alternating-current power from the commercial power system can be charged to the accumulator via the inverter circuit and the charger/discharger circuit. Consequently, inexpensive power during nighttime can be charged in the accumulator, and the power can be discharged from the accumulator and used in daytime.

According to the technology disclosed herein, in all operating modes of charging operation of charging direct-current power obtained from a direct-current power source to an accumulator, an alternating-current output operation of converting the direct-current power from the direct-current power source to alternating-current power and supplying the alternating-current power to an alternating-current load, an alternating-current output operation of supplying the direct-current power obtained from the accumulator to the alternating-current power and supplying the alternating-current power to the alternating-current load, and a charging operation of charging the alternating-current power from a commercial power system to the accumulator, drive power can be stably supplied to a control circuit even when service of the commercial power system stops, the accumulator over-discharges, and the like. Therefore, a power conditioner of high reliability can be provided.

DETAILED DESCRIPTION

Figure 1:
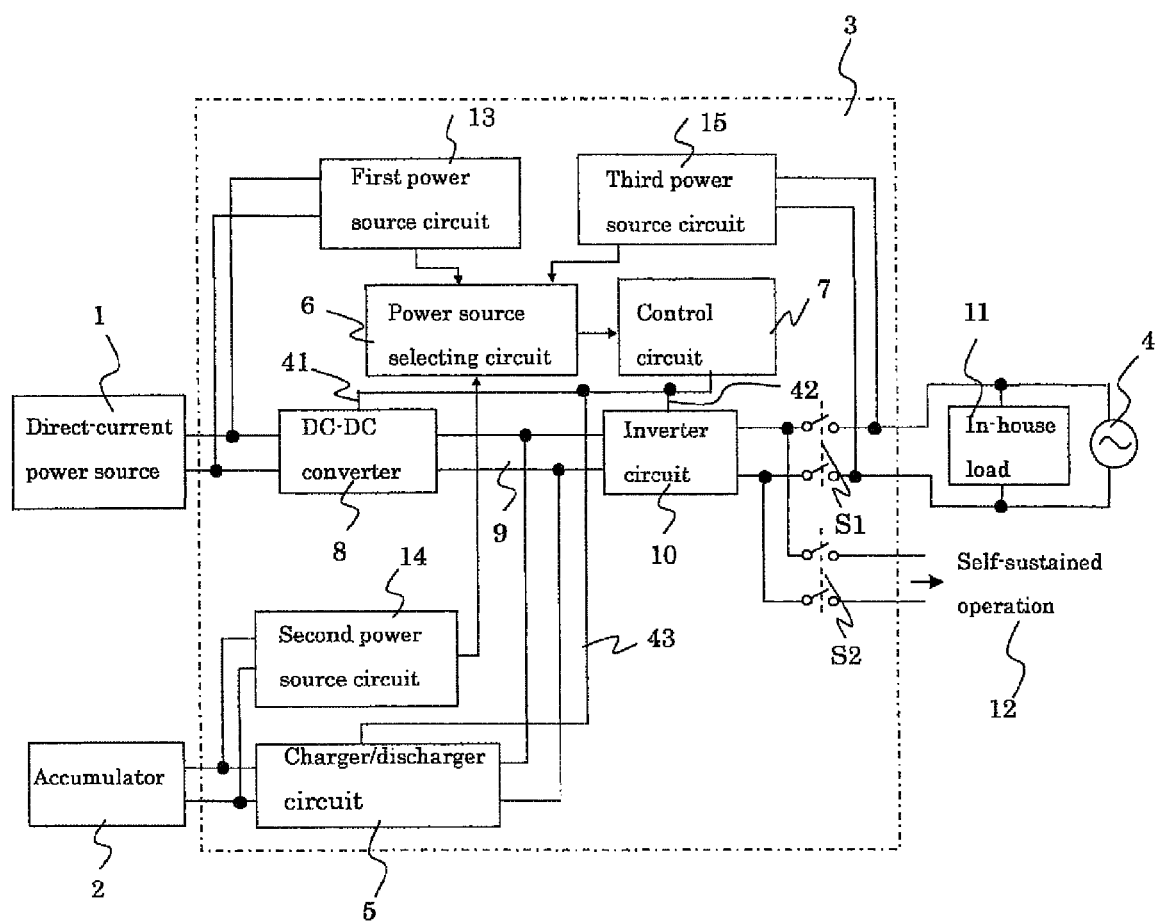
FIG. 1 is a block diagram of a power conditioner as an example embodiment of the technology disclosed herein.

FIG. 1 is a schematic configuration diagram of a power conditioner as an embodiment of the technology disclosed herein.

As a power source 1, a direct current power source, for example, a power generator or a wind power generator can be used. If the current outputted from the power source is alternating current, such alternating-current outputted from the power source 1 is rectified and can then be used as direct-current power. A solar cell, a fuel cell, or the like can also be used, and direct-current power generated by any of the cells can be used. In the present example embodiment, a solar cell is used.

As an accumulator 2, for example, a secondary cell, an electric double layer capacitor, or a direct-current power storage apparatus such as a superconductive power storage can be used. In the present embodiment, a secondary cell is used.

In a conventional home, an in-house load 11 is connected to a commercial power system 4. The alternating-current power outputted from the direct-current power source 1 and the accumulator 2 via a power conditioner 3 and a switch S1 is consumed in the in-house load 11. However, residual power which is not consumed in the in-house load 11 is reversely passed to the commercial power system 4 side.

The power conditioner 3 mainly has a DC-DC converter 8, an inverter circuit 10, and a charger/discharger circuit 5. The direct-current power of the direct current power source 1 is boosted by the DC-DC converter 8. The direct-current power is converted to alternating-current power of commercial frequency by the inverter circuit 10, and for example, the alternating-current power is outputted to the commercial power system 4 of a single phase and 200 V. The charger/discharger circuit 5 is connected to a direct-current bus 9 connecting the DC-DC converter 8 and the inverter circuit 10, and the charger/discharger circuit 5 charges or discharges the accumulator 2.

To realize a self-sustained mode in which the power conditioner 3 operates as an emergency power source independently of the commercial power system 4 in a case where service interruption occurs in the commercial power system 4, it is desirable to provide a self-sustained operation output 12 as an output terminal of the inverter circuit 10 via a switch S2.

The DC-DC converter 8 is a voltage converting circuit for boosting the direct-current voltage of the solar cell of 100 to 300 V to about 350 V. As the DC-DC converter, for example, a known circuit such as a booster chopper shown in FIG. 2A or a current resonance insulated converter shown in FIG. 2B can be applied.

Figure 2A:
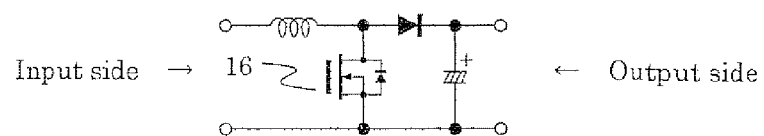
FIG. 2 is a circuit diagram of a DC-DC converter in the example embodiment of the technology disclosed herein.

As shown in FIG. 2A, the booster chopper is a common circuit in which a switch element 16 is driven by PWM (Pulse Width Modulation) at about 20 kHz, and which can obtain a direct-current voltage higher than that on an input side.

Figure 2B:
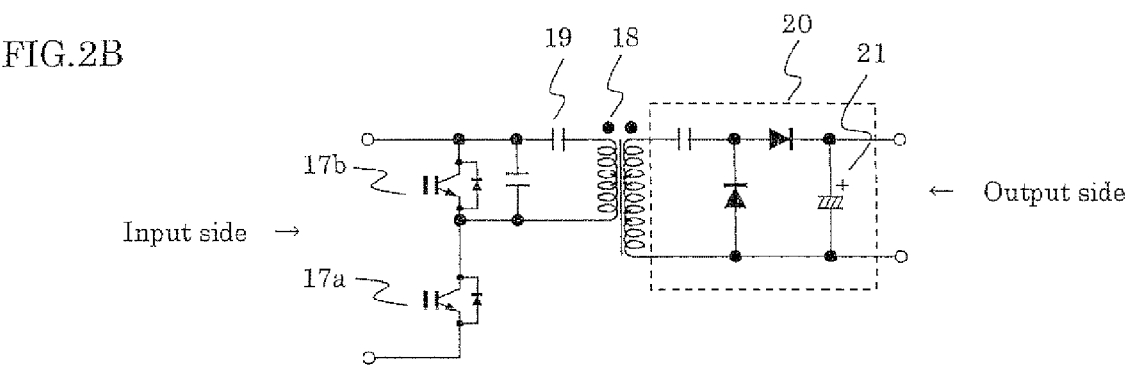

In a current resonance insulating capacitor of FIG. 2B, a main switch element 17a and an auxiliary switch element 17b are turned on and off alternately to drive a high-frequency transformer 18 at a post stage. The high-frequency transformer 18 is a leakage transformer having a leak inductance. A turn ratio is in a range of 1.5 to 2. Using current resonance of a leak inductance component of the transformer and a resonance capacitor 19, soft switching of the main switch element 17a and the auxiliary switch element 17b is achieved. The switch elements 17a and 17b are driven alternately by PFM (Pulse Frequency Modulation) in which a drive frequency varies in a range of 15 kHz to 70 kHz. Since a voltage doubler rectifier 20 is provided on a secondary side of the high-frequency transformer 18, a capacitor 21 is charged with a voltage which is twice as high as a voltage on a secondary winding boosted by the high-frequency transformer 18, and the voltage is converted to direct-current voltage of about 350 V.

As the switch elements 16, 17a, and 17b, a MOSFET, an IGBT (Insulated Gate Bipolar Transistor), and the like may be used. Since an input and an output are insulated from each other in the current resonance insulated converter of FIG. 2B in contrast with the booster chopper of FIG. 2A, in a case of using the latter insulated converter, a system having high safety in which power is not continuously passed from the alternating current side when a grounding fault occurs on the direct current side of the power conditioner 3 can be provided.

The charger/discharger circuit 5 is constructed by a bidirectional DC-DC converter for boosting the direct-current output voltage of the secondary cell of 150 V to 250 V to about 350 V. As the bidirectional DC-DC converter, for example, a bidirectional chopper shown in FIG. 3 or a bidirectional insulated Cuk converter shown in FIG. 4 can be applied.

Figure 3A:
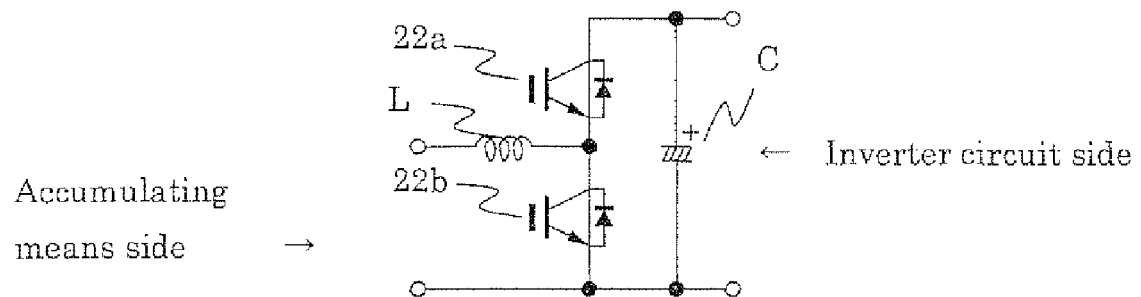
FIG. 3 is a circuit diagram showing a bidirectional chopper of a charger/discharger circuit in the example embodiment of the technology disclosed herein.

First, an operation of the bidirectional chopper of FIG. 3 will be described. FIG. 3A is a circuit diagram, FIG. 3B is an operation explanation circuit diagram in discharging operation, and FIG. 3C is an operation explanation circuit diagram in charging operation.

As shown in FIG. 3A, the bidirectional chopper has switch elements 22a and 22b, and the accumulator is connected between a connection point of the switch elements 22a and 22b and a ground via an impedance element L. A capacitor C is connected between both ends of the switching elements 22a and 22b, and output terminals are connected to the direct-current bus 9 connecting the DC-DC converter 8 and the inverter circuit 10.

Figure 3B:
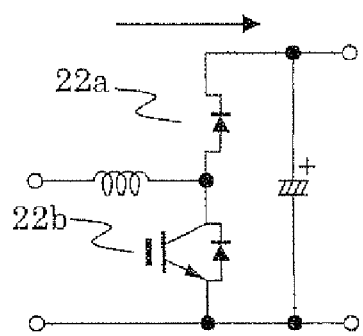

As shown in FIG. 3B, in the discharging operation, the switch element 22a is set in a normally-off state, and the switch element 22b is PWM (Pulse Width Modulation) driven at about 20 kHz. Consequently, the bidirectional chopper operates as a boosting chopper equivalent to that of FIG. 2A. By the operation, a direct-current voltage higher than that on the input side (the accumulator side) can be obtained on the output side (the inverter circuit side).

Figure 3C:
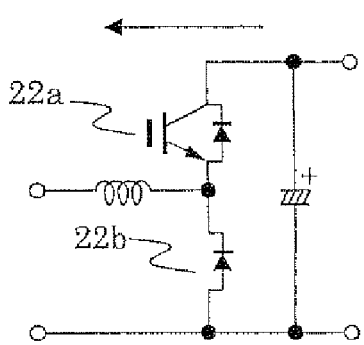

In the charging operation shown in FIG. 3C, the switch element 22b is set in a normally-off state, and the switch element 22a is PWM (Pulse Width Modulation) driven at about 20 kHz. Consequently, the bidirectional chopper can operate as a general step-down chopper for performing decreasing the voltage from the inverter circuit side toward the accumulator side.

Since the switch element uses a MOSFET or IGBT, when the switch element is set in the normally-off state, a body diode built in the switch element functions as a diode element, and is in the normally-off state.

As described above, by changing the switch element which is set in the normally-off state in accordance with a power distribution direction, a bidirectional operation is realized. Therefore, it is unnecessary to newly increase the number of switch elements such as diodes, and a bidirectional DC-DC converter of low cost can be obtained.

Next, an operation of the bidirectional insulated Cuk converter of FIG. 4 will be described.

Figure 4A:
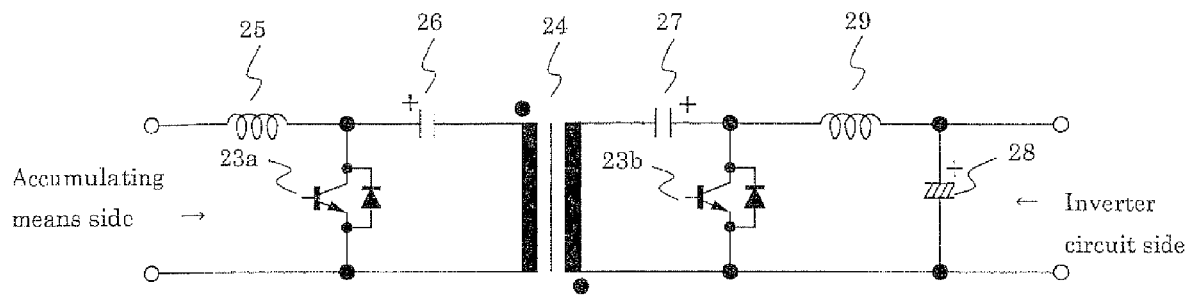
FIG. 4 is a circuit diagram of a bidirectional insulated Cuk converter of the charger/discharger circuit in the example embodiment of the technology disclosed herein.
Figure 4B:
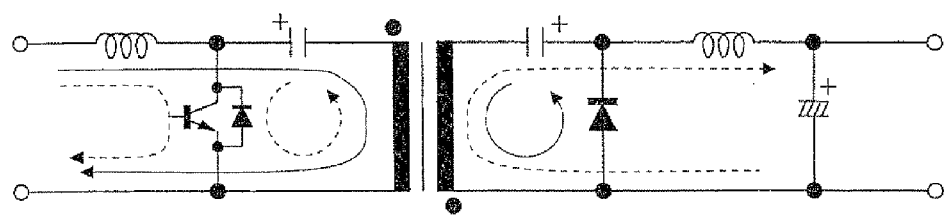
Figure 4C:
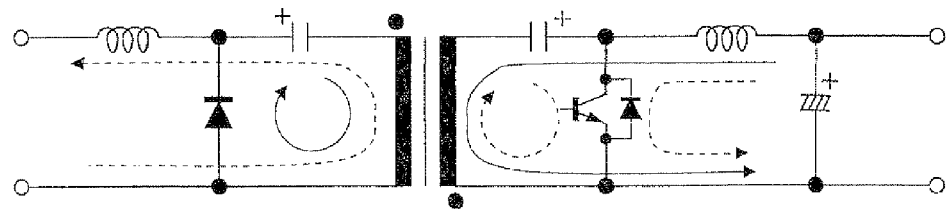

FIG. 4A is a circuit diagram, FIG. 4B is an operation explanation circuit diagram in discharging operation, and FIG. 4C is an operation explanation circuit diagram in charging operation.

As shown in FIG. 4A, the bidirectional insulated Cuk converter has switch elements 23a and 23b on a primary side and a secondary side, respectively, of a high-frequency transformer 24 designed to have a turn ratio of 1.5 to 2.5 times. The accumulator is connected on the primary side, and a reactor 25 and a capacitor 26 are connected. On the secondary side, the bidirectional insulated Cuk converter is connected to the direct-current bus 9 connecting the DC-DC converter 8 and the inverter circuit 10 via a capacitor 27, a reactor 29, and an electrolytic capacitor 28.

As shown in FIG. 4B, in the discharging operation, the switch element 23b on the secondary side is controlled to a normally-off state. Like the bidirectional chopper, the switch elements also use a MOSFET and an IGBT, so that they behave as diode elements in the off state. The switch element 23a on the primary side is PWM driven at about 20 to 50 kHz.

When the switch element 23a is off, as shown by a solid line in FIG. 4B, current flows in a path starting from the accumulator 2 and returning to the accumulator 2 via the reactor 25, the capacitor 26, and the primary side of the high-frequency transformer 24, thereby charging the capacitor 25. At the same time, on the secondary side of the high-frequency transformer 24, current flows starting from the capacitor 27 and returning to the capacitor 27 via the secondary side of the transformer and the switch element 23b, thereby charging the capacitor 27.

When the switch element 23a is on, as shown by the dashed line in FIG. 4B, current flows in a path starting from the accumulator 2 and returning to the accumulator 2 via the reactor 25 and the switch element 23a, thereby accumulating energy to the reactor 25. At the same time, discharging current flows in a path starting from the capacitor 26 and returning to the capacitor 26 via the switch element 23a and the primary side of the transformer. On the secondary side of the transformer, at the same time, the current discharged from the capacitor 27 flows in a path starting from the capacitor 28 and returning to the capacitor 28 via the secondary side of the transformer, the capacitor 27, and the reactor 29.

As described above, energy is transmitted from the primary side of the transformer to the secondary side, and direct-current voltage of 350 V is obtained on the inverter circuit side.

In the charging operation, as shown in FIG. 4C, the switch element 23a on the primary side is controlled in the normally-off state. Since the circuit is laterally symmetrical, the other operations are similar to the above. A direct-current voltage of 350 V given from the inverter circuit side is decreased to about 200 V and stored in the accumulator side. As described above, by switching the switch element which is in the normally-off state according to the power distribution direction, the bidirectional operation is realized. Consequently, it is unnecessary to newly increase the number of switch elements, and a bidirectional DC-DC converter of low cost can be obtained.

Since the input and the output are insulated from each other in the bidirectional insulated Cuk converter of FIG. 4 in contrast with the bidirectional chopper of FIG. 3, in a case of using the latter bidirectional insulated Cuk converter, a system having high safety in which power is not continuously passed from the alternating current side when a grounding fault occurs on the direct current side of the power conditioner 3 can be provided.

Figure 5A:
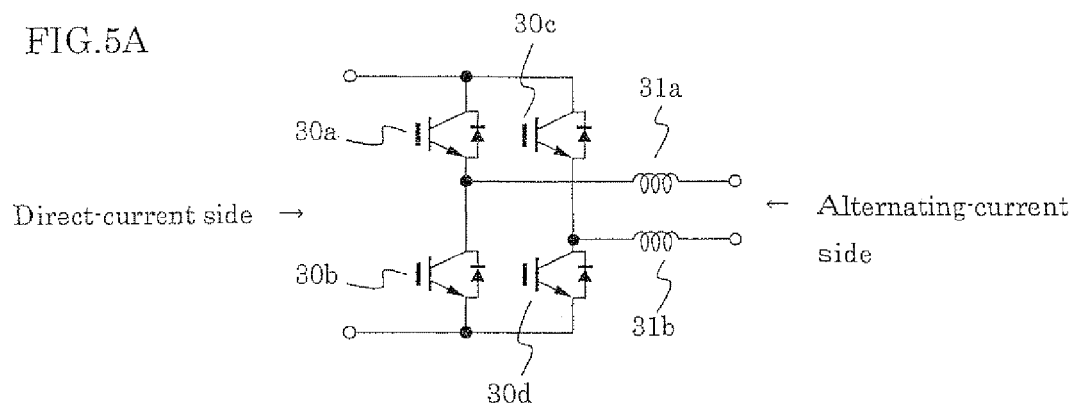
FIG. 5 is a circuit diagram of an inverter circuit in the example embodiment of the technology disclosed herein.

As the inverter circuit 10, as shown in FIG. 5A, a full bridge circuit made of four switch elements 30a, 30b, 30c, and 30d can be used. As the switch element, a MOSFET or IGBT is used, and the switch element is PWM driven at about 20 kHz. An output waveform of the full bridge circuit is smoothed by reactors 31a and 31b, and the resultant is outputted as an almost sine wave.

In a case where a commercial power system is connected on the alternating current side of the inverter circuit 10, an output voltage of the inverter circuit 10 is determined by the voltage of the commercial power system. Consequently, an amount of the output current of the inverter circuit 10 is controlled so that the voltage on the direct current side becomes constant. That is, the inverter circuit 10 is controlled as a current-type inverter.

In a case where a commercial power system is not connected on the alternating current side of the inverter circuit 10 but only an alternating current load such as the in-house load 11 is connected or in a case of self-sustained operation, the inverter circuit 10 is controlled so that the output voltage of the inverter circuit becomes constant and the voltage on the direct current side becomes constant. That is, the inverter circuit 10 is controlled as a voltage-type inverter.

Preferably, the inverter circuit 10 is a bidirectional inverter capable of performing AC-DC converting operation from the commercial power system 4 side to the direct-current bus 9 side (at night, when the financial cost/charge for electric power is low) for the following reason. Since the charger/discharger circuit 5 performs the charging operation during the AC-DC converting operation of the inverter circuit 10, during the night the electric power can be charged in the accumulator 2 and be used in daytime in the in-house load 11.

Figure 5B:
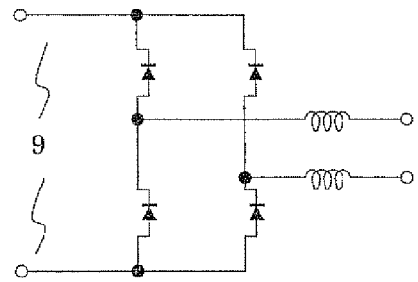

Since a MOSFET or IGBT is used as the switch element in the inverter circuit 10, by setting all of the switch elements in the normally-off state, the full-bridge circuit becomes a diode bridge as shown in the operation explanation circuit diagram of FIG. 5B. Consequently, the AC-DC converting operation from the commercial power system 4 side to the direct current bus 9 side can be realized. By the above-described method, the bidirectional operation can be realized without increasing the number of switch elements. Thus, a low-cost bidirectional inverter can be obtained. In this case, the voltage of the direct-current bus 9 is determined by a peak value of AC 200 V of the commercial power system 4, so that the direct-current bus voltage becomes about 280 V.

By performing switching operation described below, the inverter circuit 10 can perform power factor improvement control on an input current waveform during the AC-DC converting operation. A power factor improvement circuit is a circuit for improving the power factor of an input current waveform by making the input AC current waveform close to the input AC voltage waveform in an AC-DC converting circuit. A booster chopper may generally be used as the power factor improvement circuit.

Figure 5C:
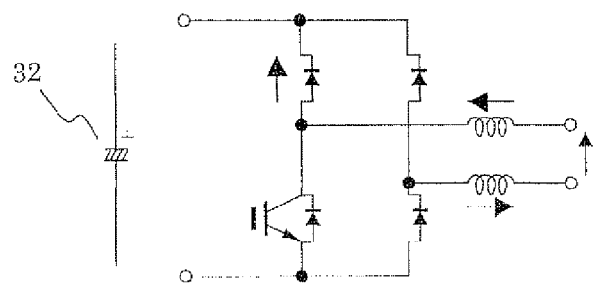

In the operation explanation circuit diagram of FIG. 5B, in a case where alternating-current power is supplied from the alternating current side to the inverter circuit 10 and the reactor 31a side has a high potential, the switch element 30b is PWM driven at about 20 kHz and all of the other switch elements are set in the normally-off state as shown in FIG. 5C. In this case, the booster chopper is configured by the reactors 31a and 31b, the switch element 30b, the switch element 30a serving as a diode, and the DC-DC converter 8 on the direct-current bus 9 side or a capacitor 32 built in the charger/discharger circuit 5.

Figure 5D:
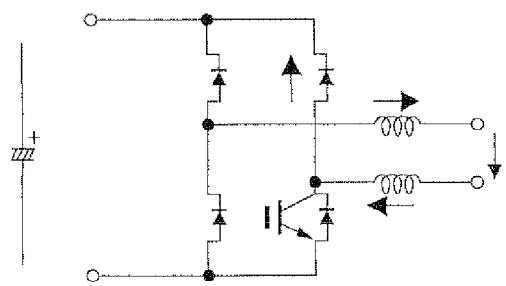

In a case where the reactor 31b side has high potential like in the operation explanation circuit diagram of FIG. 5D, the switch element 30d is PWM driven at about 20 kHz, and all of the other switch elements are set in the normally-off state. In this case, the booster chopper is configured by the reactors 31a and 31b, the switch element 30d, the switch element 30c serving as a diode, and the capacitor 32, as in FIG. 5C.

That is, by changing driving between the switch elements 30b and 30d every half cycle of the commercial frequency, the inverter circuit 10 can be made to operate as a power factor improvement circuit for always performing boosting operation from the alternating-current side to the direct-current side.

In the present embodiment, the voltage on the direct-current bus 9 side is set to about 330 V to 350 V. As described above, by making the inverter circuit 10 operate as a power factor improvement circuit during the AC-DC converting operation, a high-quality power conditioner 3 may be provided in which higher harmonics do not flow to the commercial power system 4 side during the charging operation from the commercial power system 4 to the accumulator 2.

The operation of the power conditioner 3 is controlled by a control circuit 7 having a microprocessor such as a microcomputer or a DSP (Digital Signal Processor). The control circuit 7 does not have to control all operations of components of the power conditioner such as the charger/discharger circuit 5, the DC-DC converter 8, the inverter circuit 10 and the like. In the present embodiment, basic switching operations of the DC-DC converter 8 and the charger/discharger circuit 5 are controlled by a child control circuit which is not shown in FIG. 1. The control circuit 7 gives instructions of start of operation, stop of operation, and the like to the DC-DC converter 8, the inverter circuit 10, and the charger/discharger circuit 5. Based on the instructions, the child control circuit operates the components. In such a manner, an operation of an entire power conditioner is controlled. FIG. 1 shows control lines 41, 42, and 43 connected from the control circuit 7 to the charger/discharger circuit 5, the DC-DC converter 8, and the inverter circuit 10.

The control circuit 7 has a power source selecting circuit 6 so that drive power is supplied from at least one of a first power source circuit 13 using the direct-current power source 1 as an input, a second power source circuit 14 using the accumulator 2 as an input, and a third power source circuit 15 using the commercial power system 4 as an input.

Figure 6A:
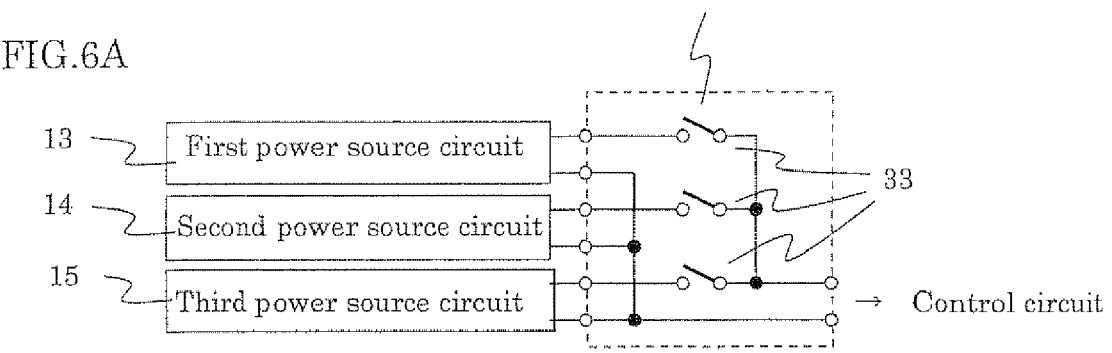
FIG. 6 is a circuit diagram of a power source selecting circuit in the embodiment of the technology disclosed herein.
Figure 6B:
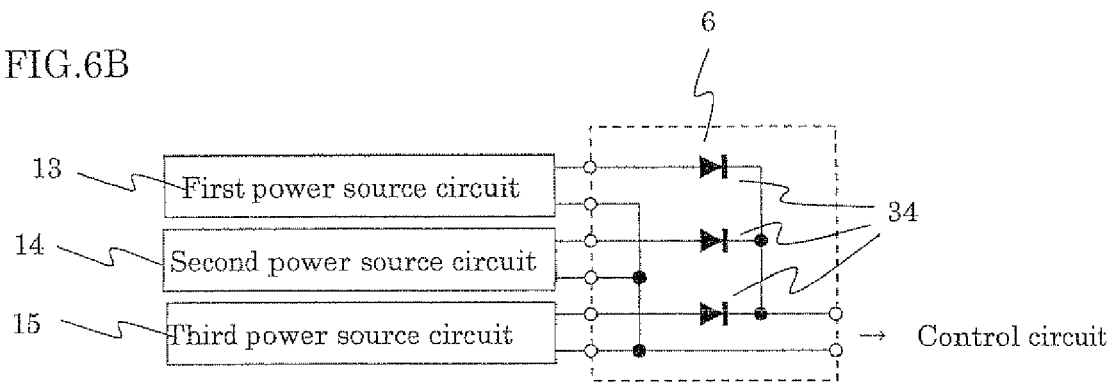

As shown in FIG. 6A, the power source selecting circuit 6 may be of a type of selecting connection of drive power sources from the first to third power source circuits 13 to 15 by a switch unit 33. As shown in FIG. 6B, the power source selecting circuit 6 may be of a type that outputs of the first to third power source circuits 13 to 15 are connected to each other via diodes 34 and the drive power source having a largest output voltage is selected according to output voltages of the power source circuits. In a case of FIG. 6B, a comparing circuit for comparing output voltages with a predetermined set value and outputting an output voltage larger than a set value may also be provided. In the former case, as the switch unit 33, a mechanical relay, a MOSFET, a photo MOS relay, or the like can be used. An instruction for turning on/off the switch unit 33 is given by the control circuit 7 according to priority. In the latter case, different from the former case, the drive power source is selected according to the power source circuit output voltages, and it is unnecessary to use a switch element which has to be controlled by the drive signal. Consequently, the power source selecting circuit 6 of lower cost can be provided.

Hereinafter, operations of the power source circuit and the power source selecting circuit in an actual operation of the power conditioner will be described.

In a midnight time zone, the charging operation of converting alternating-current power from the commercial power system 4 to direct-current power and charging the accumulator 2 is performed. It is assumed here that the midnight power time zone of low power charge is from 11 pm to 7 am. In this case, for the following reason, it is preferable to drive the control circuit 7 by supplying power from the third power source circuit 15 using the commercial power system 4 as an input via the power source selecting circuit 6.

In the accumulator 2, after sunset in which a solar cell does not generate power and in the midnight power time zone, a request for the discharging operation to a demand of an in-house load such as a microwave or an IH cooking heater is strong. Consequently, there is a case that the charging level of a secondary cell decreases to around a lower limit of discharging just before the midnight power time zone. Therefore, even if a power source for operating the control circuit 7 to perform the charging operation by using the midnight power depends on a second power source circuit using the accumulator 2 as an input, when the secondary cell is in a discharge lower limit state, the secondary cell cannot discharge.

In such a case, since the second power source circuit cannot supply drive power to the power source selecting circuit 6 and the first power source circuit does not operate during nighttime, it is desirable that the third power source circuit supplies the drive power of the control circuit 7.

Figure 7:
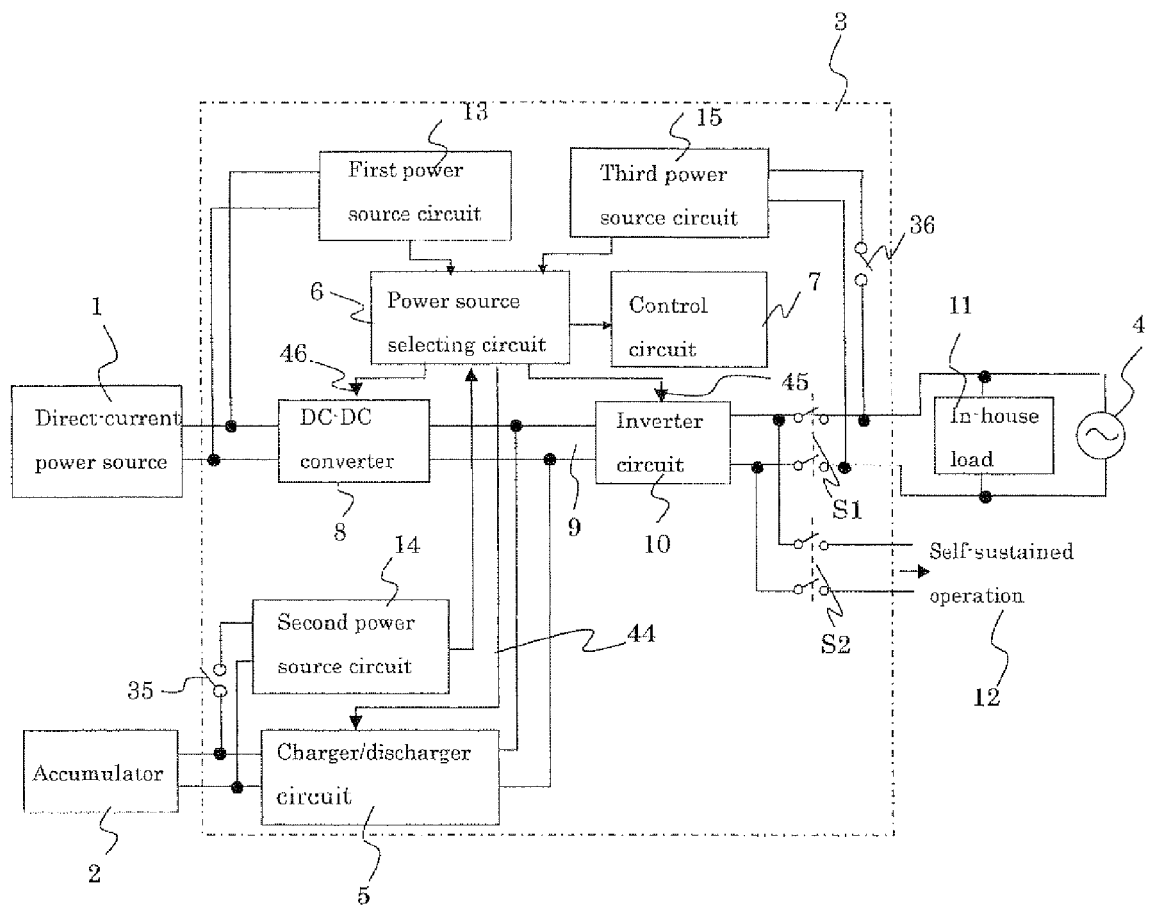
FIG. 7 is a diagram for describing operation of the power conditioner as the embodiment of the technology disclosed herein.
Figure 8:
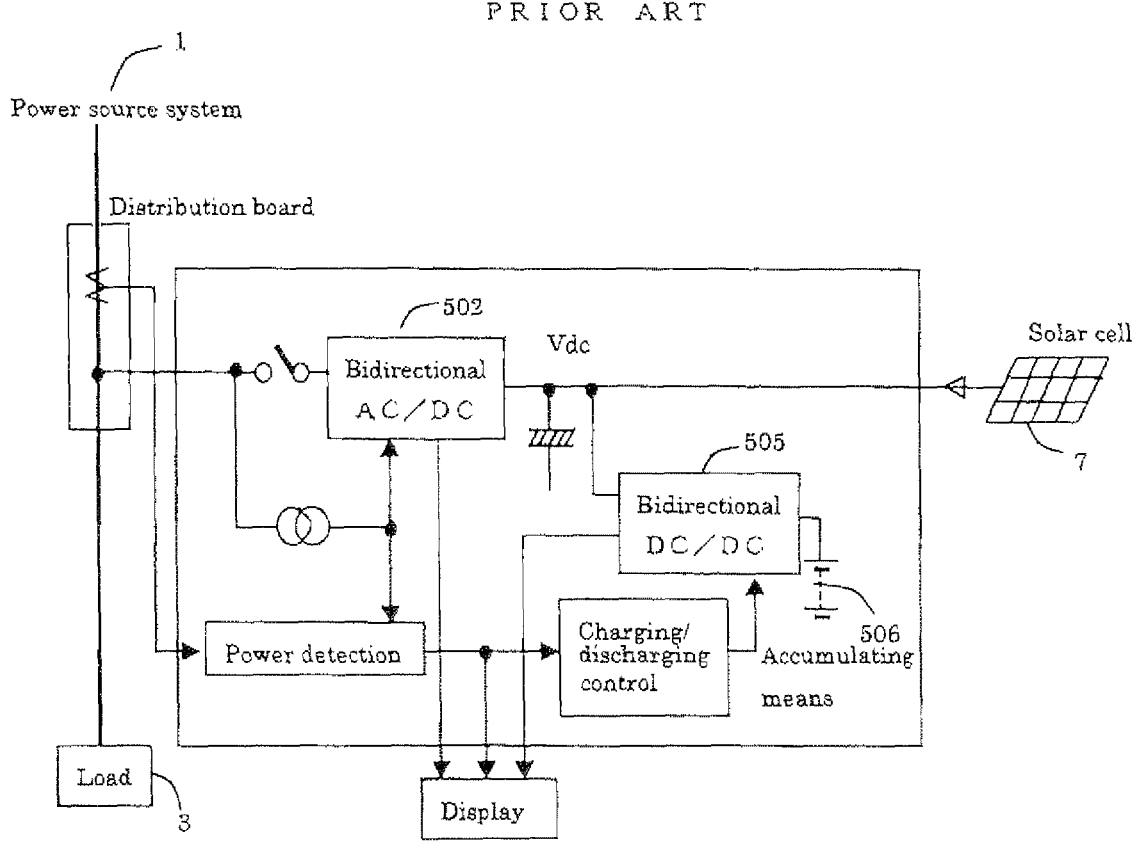
FIG. 8 is a configuration diagram of a conventional power conditioner.

To make the entire power conditioner 3 function in the charging operation in the midnight power time zone, a configuration of FIG. 7 may be employed. Specifically, the third power source circuit 15 drives the control circuit 7 via the power source selecting circuit 6. In addition, as shown by a connection line 44, a wire for supplying the drive power from the third power source circuit 15 to the charger/discharger circuit 5 via the power source selecting circuit 6 is provided. As shown by a connection line 45, a wire for supplying drive power from the third power source circuit 15 to the inverter circuit 10 via the power source selecting circuit 6 is also provided. Further, as shown by a connection line 46, a wire for supplying drive power from the third power source circuit 15 to the DC-DC converter 8 via the power source selecting circuit 6 is provided.

In FIG. 7, to avoid complication, the control lines 41, 42, and 43 shown in FIG. 1 are not shown.

Since the solar cell of the direct-current power source 1 starts generating power at a crack of dawn, there is a case that the DC-DC converter 8 starts direct-current output at an early morning in a time zone at an end of the midnight power time zone. It is preferable to finish the charging operation in the midnight power time zone before power generation of the solar cell starts, that is, before dawn so that the inverter circuit 10 can convert the direct-current outputted from the DC-DC converter 8 to the alternating-current output and supply the alternating-current outputted to the in-house load 11 in such a case. Since the start of power generation of the solar cell, that is, dawn varies according to season variations, it is desirable to have a timer responding to the season variations. Since the start of power generation also varies according to weather, it is desirable to perform control interlocked with weather.

In many cases, a demand of the in-house load such as a microwave or IH cooking heater is high in the early morning as in the time zone around the end of the midnight power time zone. Consequently, it is desirable to set the accumulator 2 in a discharge wait state in which the accumulator 2 can always supply stored power to the in-house load 11 as soon as the midnight power time zone ends. Therefore, in the midnight power time zone after the accumulator 2 enters a full charge state by the charging operation in the midnight power time zone, the control circuit 7 stops the inverter circuit 10 and the charger/discharger circuit 5. Further, the drive power source supplied from the third power source circuit to the control circuit 7 via the power source selecting circuit 6 in the charging operation is switched to a path of supplying the drive power source from the second power source circuit to the control circuit 7 via the power source selecting circuit 6.

By this operation, in a case where consumption of the in-house load occurs after the midnight power time zone, the control circuit 7 can immediately shift to the discharging operation of outputting alternating current from the accumulator 2 via the charger/discharger circuit 5 and the inverter circuit 10.

To realize the operation above, it is sufficient to provide a switch unit 35 between the second power source circuit and the accumulator 2 as shown in FIG. 7. The switch unit 35 is turned on in response to an instruction of the control circuit 7 after the accumulator 2 enters the full charge state in the midnight power time zone. In the power source selecting circuit 6 in FIG. 6B, the output voltage of the second power source circuit is designed to be higher than that of the third power source circuit. With this design, the second power source circuit is selected with preference over the third power source circuit when the switch unit 35 is turned on, and the drive power source of the control circuit 7 is supplied from the second power source circuit. At this time, the third power source circuit hardly consumes power, so that consumption of power from the commercial power supply can be decreased after end of charging. Further, it is more preferable to provide a switch unit 36 between the third power source circuit and the commercial power system 4 as shown in FIG. 7, turn on the switch unit 35, and then turn off the switch unit 36 by an instruction from the control circuit 7 so that consumption of power from the commercial power system can be made perfectly zero.

As the switch units 35 and 36, a mechanical relay, a MOSFET, a photo MOS relay, and the like can be used. As shown in FIG. 7, desirably, the second power source circuit drives the control circuit 7 via the power source selecting circuit 6 and, in addition, can supply the drive power to the charger/discharger circuit 5 and the inverter circuit 10 via the connection lines 44 and 45 via the power source selecting circuit 6.

In a case where the solar cell starts generating power, desirably, the drive power source of the control circuit 7 is supplied from the first power source circuit via the power source selecting circuit 6 with preference over the second power source circuit for the following reason. In a case where the second power source circuit supplies the drive power source of the control circuit 7 via the power source selecting circuit 6, the accumulator 2 always gradually discharges at least only by the drive power of the control circuit 7, so that the residual capacitance of the accumulator decreases. Consequently, in a case where the drive power source can be supplied from the solar cell, by always supplying the drive power of the control circuit 7 from the first power source circuit, the residual capacitance of the accumulator can be prevented from decreasing.

Desirably, as shown in FIG. 7, the first power source circuit drives the control circuit 7 via the power source selecting circuit 6 and also can supply the drive power to the DC-DC converter 8 and the inverter circuit 10 through the connection lines 46 and 45 via the power source selecting circuit 6.

Further, in a case where the solar cell or the accumulator 2 outputs power, the drive power source of the control circuit 7 does not have to be supplied from the third power source circuit via the power source selecting circuit 6. Consequently, it is desirable to supply the drive power source of the control circuit 7 from the first or second power source circuit with preference over the third power source circuit via the power source selecting circuit 6. To execute the preferential selection from the power source circuits by the circuit of FIG. 6B, it is desirable to set that "output voltage of the first power source circuit">"output voltage of the second power source circuit">"output voltage of the third power source circuit".

In a case where generation power of the solar cell is larger than consumption power of the in-house load 11 in daytime, the generation power of the solar cell can be charged in the accumulator 2 via the DC-DC converter 8 and the charger/discharger circuit 5. In this case, the drive power of the charger/discharger circuit 5 can also be supplied from the first power source circuit via the power source selecting circuit 6. However, there is the case that the generation power of the solar cell rapidly drops to zero due to solar insolation variation. To enable the power conditioner 3 to supply alternating current power to the in-house load 11 so as to follow a change also in such a case, the charger/discharger circuit 5 has to always wait so as to be switched from the charging operation to the discharging operation. Therefore, in the case of the charging operation of storing generation power of the solar cell to the accumulator 2, preferably, the drive power is supplied from the second power source circuit to the charger/discharger circuit 5.

In a case where generation power of the solar cell is larger than consumed power of the in-house load 11 and the accumulator 2 is sufficiently charged, residual power which is not consumed in the in-house load 11 is reversely flowed.

After sunset, the solar cell does not generate power, so that the first power source circuit does not operate. Consequently, the drive power source of the control circuit 7 is supplied from the second power source circuit via the power source selecting circuit 6. As described above, in the time zone after sunset, the in-house load demand is high, and the discharging operation of outputting the alternating current from the accumulator 2 via the charger/discharger circuit 5 and the inverter circuit 10 is performed. In the midnight power time zone, the discharging operation is stopped. Thereafter, the operation shifts to the operation of charging power from the commercial power system 4 to the accumulator 2. The control circuit 7 turns on the switch unit 36 and then turns off the switch unit 35, thereby supplying drive power source from the third power source circuit to the control circuit 7 via the power source selecting circuit 6.

The invention claimed is:

1. A power conditioner comprising:
a power converting circuit for converting direct-current power obtained from a direct-current power source to alternating-current power of a commercial power system;
a charger/discharger circuit for charging the direct-current power obtained from the direct-current power source to an accumulator or discharging the direct-current power stored in the accumulator;
a control circuit for controlling the power converting circuit and the charger/discharger circuit;
a first power source circuit for supplying power from the direct-current power source to the control circuit;
a second power source circuit for supplying power from the accumulator to the control circuit;
a third power source circuit for supplying power from the commercial power system to the control circuit; and
a power source selecting circuit for selecting at least one of the first, second, and third power source circuits and supplying power to the control circuit.

2. The power conditioner according to claim 1, wherein the power converting circuit includes a DC-DC converter and an inverter circuit, and the inverter circuit converts direct-current power to alternating-current power to output the alternating-current power to the commercial power system interconnected thereto.

3. The power conditioner according to claim 2, wherein the inverter circuit is a bidirectional inverter, alternating-current power supplied from the commercial power system is converted to direct-current power by the bidirectional inverter, and the direct-current power is charged into the accumulator by the charger/discharger circuit, or direct-current power accumulated in the accumulator is discharged by the charger/discharger circuit, the direct-current power is converted to alternating-current power by the bidirectional inverter, and the alternating-current power is outputted to the commercial power system or supplied to a load.

4. The power conditioner according to claim 1, wherein the first power source circuit supplies power to the control circuit, the DC-DC converter, and the inverter circuit via the power source selecting circuit.

5. The power conditioner according to claim 1, wherein the second power source circuit supplies power to the control circuit, the inverter circuit, and the charger/discharger circuit via the power source selecting circuit.

6. The power conditioner according to claim 1, wherein the third power source circuit supplies power to the control circuit, the inverter circuit, and the charger/discharger circuit via the power source selecting circuit.

7. The power conditioner according to claim 1, wherein the power source selecting circuit selects the first power source circuit preferentially over the second and third power source circuits.

8. The power conditioner according to claim 1, wherein the power source selecting circuit selects the second power source circuit preferentially over the third power source circuit.

9. The power conditioner according to claim 1, wherein the power source selecting circuit is a circuit that is selectively connected to any of the first, second, and third power source circuits.

10. The power conditioner according to claim 1, wherein the power source selecting circuit is a circuit for selecting as a power source circuit whichever of the first, second, and third power source circuits has a largest output voltage.

* * * * *